United States Patent
Thatcher et al.

(10) Patent No.: US 11,333,082 B2
(45) Date of Patent: May 17, 2022

(54) SYSTEMS AND METHODS FOR DETERMINATION OF GAS TURBINE FUEL SPLIT FOR HEAD END TEMPERATURE CONTROL

(71) Applicant: General Electric Company, Schenectady, NY (US)

(72) Inventors: Jonathan Carl Thatcher, Bradford, MA (US); Robert Joseph Loeven, II, Simpsonville, SC (US); John Rogers Huey, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 118 days.

(21) Appl. No.: 16/900,761

(22) Filed: Jun. 12, 2020

(65) Prior Publication Data
US 2021/0388775 A1    Dec. 16, 2021

(51) Int. Cl.
*F02C 9/54* (2006.01)
*F02C 7/228* (2006.01)
(Continued)

(52) U.S. Cl.
CPC ............... *F02C 9/54* (2013.01); *F02C 7/228* (2013.01); *F02C 7/232* (2013.01); *F02C 9/28* (2013.01); *F23R 3/26* (2013.01); *F23R 3/346* (2013.01); *F05D 2240/35* (2013.01); *F05D 2260/81* (2013.01); *F05D 2270/303* (2013.01); *F05D 2270/3061* (2013.01); *F05D 2270/71* (2013.01); *F23N 2223/40* (2020.01); *F23N 2241/20* (2020.01)

(58) Field of Classification Search
CPC .... F02C 7/228; F02C 9/26; F02C 9/28; F02C 9/32; F02C 9/34; F02C 9/54; F23R 3/346; F23N 2223/40; F23N 1/002; F05D 2260/81
See application file for complete search history.

(56) References Cited

U.S. PATENT DOCUMENTS

| | | | |
|---|---|---|---|
| 5,857,321 A | * | 1/1999 | Rajamani .................. F02C 9/28 60/39.27 |
| 6,920,759 B2 | | 7/2005 | Wakama et al. |

(Continued)

OTHER PUBLICATIONS

Extended European Search Report for Patent Application EP 21175821.4 dated Nov. 5, 2021; 8 pp.

*Primary Examiner* — Alain Chau
(74) *Attorney, Agent, or Firm* — Armstrong Teasdale LLP

(57) ABSTRACT

A method of controlling an operating temperature of a first combustion zone of a combustor of a rotary machine includes determining a current operating temperature and a target operating temperature of a first combustion zone using a digital simulation. The method further includes determining a derivative of the current operating temperature with respect to a current fuel split using the digital simulation. The fuel split apportions a total flow of fuel to the combustor between the first combustion zone and a second combustion zone. The method also includes calculating a calculated fuel split that results in a calculated operating temperature approaching the target operating temperature. The method further includes channeling a first flow of fuel to the first combustion zone and a second flow of fuel to the second combustion zone.

20 Claims, 5 Drawing Sheets

(51) Int. Cl.
  *F02C 7/232*  (2006.01)
  *F02C 9/28*  (2006.01)
  *F23R 3/26*  (2006.01)
  *F23R 3/34*  (2006.01)

(56) References Cited

U.S. PATENT DOCUMENTS

| | | | |
|---|---|---|---|
| 7,246,002 B2* | 7/2007 | Healy | F02C 9/28 |
| | | | 701/100 |
| 7,269,939 B2* | 9/2007 | Kothnur | F23N 5/003 |
| | | | 60/39.281 |
| 7,593,803 B2* | 9/2009 | Healy | F02C 9/28 |
| | | | 701/100 |
| 7,620,461 B2 | 11/2009 | Frederick, II et al. | |
| 7,742,904 B2 | 6/2010 | Healy et al. | |
| 7,822,512 B2* | 10/2010 | Thatcher | F02C 9/20 |
| | | | 700/287 |
| 7,966,802 B2* | 6/2011 | Szepek | F02C 9/28 |
| | | | 60/39.281 |
| 8,061,118 B2* | 11/2011 | Kothnur | F02C 7/228 |
| | | | 60/39.281 |
| 8,065,022 B2 | 11/2011 | Minto et al. | |
| 8,099,181 B2 | 1/2012 | Sterzing et al. | |
| 8,285,468 B2* | 10/2012 | Tonno | F23N 5/00 |
| | | | 701/100 |
| 8,423,161 B2 | 4/2013 | Wilkes et al. | |
| 8,447,564 B2 | 5/2013 | Gross et al. | |
| 8,452,515 B2 | 5/2013 | Drohan et al. | |
| 8,639,480 B2* | 1/2014 | Arnold | F02C 9/42 |
| | | | 703/2 |
| 9,043,118 B2* | 5/2015 | Healy | F01D 17/00 |
| | | | 701/100 |
| 9,494,086 B2 | 11/2016 | Pandey et al. | |
| 9,677,476 B2* | 6/2017 | Smith | F02C 9/22 |
| 9,771,875 B2* | 9/2017 | Davis, Jr. | F02C 9/42 |
| 9,790,834 B2 | 10/2017 | Miller et al. | |
| 9,791,351 B2 | 10/2017 | Miller et al. | |
| 9,909,508 B2 | 3/2018 | Jaiven et al. | |
| 10,156,361 B2* | 12/2018 | Huebner | F02C 9/34 |
| 2005/0114010 A1* | 5/2005 | Healy | F23N 1/002 |
| | | | 701/100 |
| 2006/0107666 A1* | 5/2006 | Kothnur | F02C 7/228 |
| | | | 60/773 |
| 2007/0157620 A1* | 7/2007 | Healy | F02C 9/28 |
| | | | 60/772 |
| 2008/0243352 A1* | 10/2008 | Healy | F02C 9/26 |
| | | | 701/100 |
| 2009/0005951 A1* | 1/2009 | Frederick | F23N 5/184 |
| | | | 701/100 |
| 2009/0005952 A1* | 1/2009 | Tonno | F02C 9/28 |
| | | | 701/100 |
| 2009/0173078 A1* | 7/2009 | Thatcher | F02C 9/20 |
| | | | 60/773 |
| 2009/0193788 A1* | 8/2009 | Szepek | H04B 17/345 |
| | | | 60/39.281 |
| 2010/0050652 A1 | 3/2010 | Skipper | |
| 2010/0256888 A1* | 10/2010 | Tong | F02C 7/232 |
| | | | 701/100 |
| 2011/0137536 A1* | 6/2011 | Tonno | F23N 5/00 |
| | | | 701/100 |
| 2012/0023953 A1* | 2/2012 | Thomas | F02C 7/228 |
| | | | 60/772 |
| 2012/0072194 A1* | 3/2012 | Arnold | F02C 7/057 |
| | | | 703/7 |
| 2013/0269311 A1 | 10/2013 | Wichmann et al. | |
| 2014/0090392 A1* | 4/2014 | Meisner | F02C 9/54 |
| | | | 60/39.23 |
| 2015/0240726 A1* | 8/2015 | Smith | F02C 9/22 |
| | | | 60/773 |
| 2015/0247464 A1* | 9/2015 | Pandey | F02C 6/18 |
| | | | 700/288 |
| 2015/0292402 A1 | 10/2015 | Razak | |
| 2016/0138480 A1* | 5/2016 | Davis, Jr. | F02C 3/04 |
| | | | 60/772 |
| 2016/0138808 A1* | 5/2016 | Huebner | F02C 7/228 |
| | | | 60/734 |
| 2016/0326967 A1* | 11/2016 | Yamamoto | F23N 5/242 |
| 2017/0175651 A1* | 6/2017 | Davis, Jr. | G05B 15/02 |
| 2018/0107176 A1* | 4/2018 | Sembiante | G05B 13/04 |
| 2018/0135534 A1* | 5/2018 | Ewens | F02C 9/28 |
| 2018/0149094 A1* | 5/2018 | Boehm | G05B 13/048 |
| 2018/0223742 A1* | 8/2018 | Demougeot | F02C 9/28 |
| 2020/0217252 A1* | 7/2020 | Takaki | F02C 3/04 |
| 2020/0392908 A1* | 12/2020 | Yunoki | F02C 9/28 |
| 2021/0148291 A1* | 5/2021 | Yamamoto | F02C 9/46 |
| 2021/0302023 A1* | 9/2021 | Loeven, II | F01D 21/12 |

* cited by examiner

SYSTEMS AND METHODS FOR DETERMINATION OF GAS TURBINE FUEL SPLIT FOR HEAD END TEMPERATURE CONTROL

BACKGROUND

The field of the disclosure relates generally to control of gas turbine engines and, more specifically, to controlling a fuel split in a gas turbine engine to achieve a predetermined head end temperature of a combustor.

In at least some known rotary machines, energy extracted from a gas stream in a turbine is used to power a mechanical load. Specifically, the rotary machine includes a compressor section, a combustor section, and a turbine section arranged in a serial flow arrangement. The compressor section compresses air for combustion with fuel within the combustor section, and the turbine section extracts energy from the combustion gases generated in the combustion section. At least some known combustion sections include Axial Fuel Staging (AFS) technology including axial (sequential) staging of combustion in at least two zones. More specifically, the combustion section may include a plurality of first stage fuel nozzles positioned upstream of a plurality of second stage fuel nozzles. A first flow of fuel is channeled into the combustor by the first stage fuel nozzles, and a second flow of fuel is channeled into the combustor by the second stage fuel nozzles. The intra-combustor temperature of the combustion gases generated by the combustion of the first flow of fuel is the $T_{3.5}$ temperature. Controlling the $T_{3.5}$ temperature enables an operator to control the emissions and dynamics profile of the combustor and enables greater operational flexibility of the rotary machine.

The $T_{3.5}$ temperature is typically not directly measured because of high temperatures within the combustor. Rather, a combustor inlet temperature, the first and second flow of fuel, and other known parameters are used to model or approximate the $T_{3.5}$ temperature and are used to control the $T_{3.5}$ temperature. More specifically, in at least some known rotary machines, the $T_{3.5}$ temperature is controlled using a proportional-integral (PI) controller to control the fuel split to the first and second stage nozzles. The PI controller uses the alternate parameters to control the fuel split to the first and second stage nozzles, which then indirectly controls the $T_{3.5}$ temperature. However, tuning the rotary machine such that the PI controller accurately controls the $T_{3.5}$ temperature may be time consuming and expensive. Additionally, if the gains of the PI controller are not set correctly, the PI controller may not properly control the $T_{3.5}$ temperature, potentially leading to temperature oscillations and/or combustor blow out.

BRIEF DESCRIPTION

In one aspect, a method of controlling an operating temperature of a first combustion zone of a combustor of a rotary machine is provided. The combustor includes the first combustion zone and a second combustion zone. The method includes determining a current operating temperature of the first combustion zone using a digital simulation of the rotary machine. The method also includes determining a target operating temperature of the first combustion zone. The method further includes determining a derivative of the current operating temperature of the first combustion zone with respect to a current fuel split using the digital simulation. The fuel split apportions a total flow of fuel to the combustor between the first combustion zone and the second combustion zone. The method also includes calculating, using the determined derivative, a calculated fuel split that results in a calculated operating temperature of the first combustion zone approaching the target operating temperature. The method further includes channeling a first flow of fuel to the first combustion zone and a second flow of fuel to the second combustion zone. The first flow of fuel and the second flow of fuel are determined in response to the calculated fuel split. The method also includes iterating steps i through v until the calculated fuel split equals a target fuel split, wherein the target fuel split is the fuel split that results in the target operating temperature.

In another aspect, a rotary machine is provided. The rotary machine includes a compressor configured to compress a flow of inlet air, a combustor, and a computing device. The combustor includes a first combustion zone, a second combustion zone, at least one first fuel nozzle, and at least one second fuel nozzle. The at least one first fuel nozzle is configured to channel a first flow of fuel to the first combustion zone, and the at least one second fuel nozzle is configured to channel a second flow of fuel to the second combustion zone. The combustor is configured to receive the flow of inlet air. A fuel split is a fraction of a total flow of fuel that is channeled to the second combustion zone. The computing device includes a digital simulation of the rotary machine. The computing device is configured to determine a current operating temperature of the first combustion zone using the digital simulation. The computing device is also configured to determine a target operating temperature of the first combustion zone. The computing device is further configured to simultaneously determine a derivative of the current operating temperature of the first combustion zone with respect to a current fuel split using the digital simulation. The computing device is also configured to calculate a calculated fuel split that results in a calculated operating temperature of the first combustion zone using numerical methods. The computing device is further configured to channel the first flow of fuel to the first combustion zone and the second flow of fuel to the second combustion zone. The first flow of fuel and the second flow of fuel are determined by the calculated fuel split. The computing device is also configured to iterate until the calculated fuel split equals a target fuel split, wherein the target fuel split is the fuel split that results in the target operating temperature.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
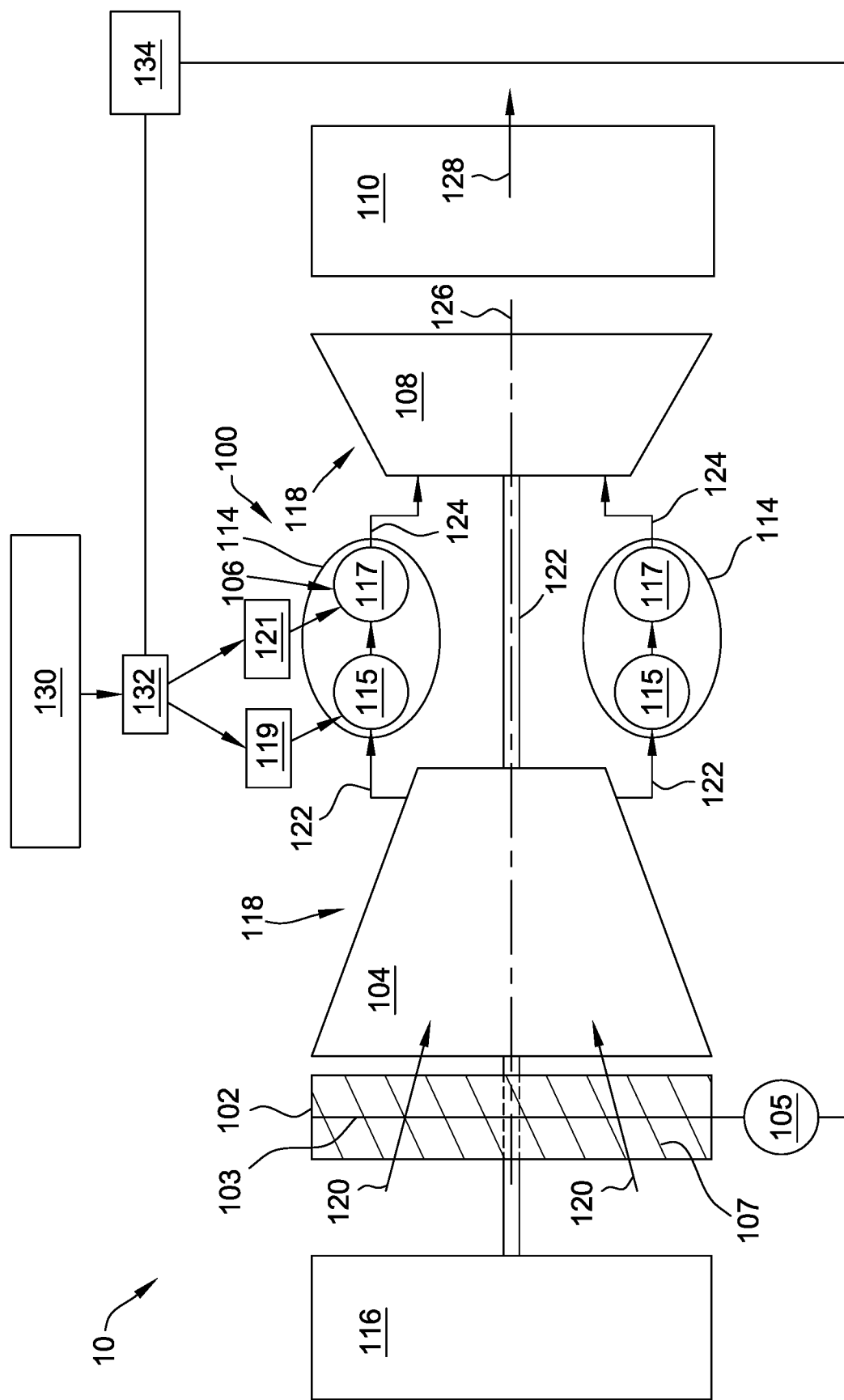
FIG. 1 is a schematic view of an exemplary rotary machine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the terms "axial" and "axially" refer to directions and orientations extending substantially parallel to a longitudinal axis of a rotary machine. Moreover, the terms "radial" and "radially" refer to directions and orientations extending substantially perpendicular to the longitudinal axis of the rotary machine. In addition, as used herein, the terms "circumferential" and "circumferentially" refer to directions and orientations extending arcuately about the longitudinal axis of the rotary machine. Further, as used herein, the term "upstream" refers to a forward or inlet end of a rotary machine, and the term "downstream" refers to an aft or exhaust end of the rotary machine. When discussing a flow of fluid through a component, the direction from which the fluid flows is described as "upstream," and the direction in which the fluid flows is described as "downstream."

The methods and systems described herein relate to a method for controlling a temperature of a first combustion zone of a combustor of a gas turbine engine using a digital simulation. More specifically, the combustor includes the first combustion zone, a second combustion zone, at least one first fuel nozzle, and at least one second fuel nozzle. The at least one first fuel nozzle channels a first flow of fuel to the first combustion zone, and the at least one second fuel nozzle channels a second flow of fuel to the second combustion zone. A fuel split is a fraction of a total flow of fuel that is channeled to the second combustion zone. The digital simulation simultaneously determines a current operating temperature of the first combustion zone, a target operating temperature of the first combustion zone, and a derivative of the current operating temperature of the first combustion zone with respect to a current fuel split. A computing device then calculates a calculated fuel split that results in a calculated operating temperature of the first combustion zone using numerical methods. The first flow of fuel and the second flow of fuel are determined by the calculated fuel split, and the first flow of fuel is channeled to the first combustion zone and the second flow of fuel is channeled to the second combustion zone. The method is iterated until the calculated fuel split equals a target fuel split that results in the target operating temperature. Accordingly, the systems and methods described herein control the temperature of the first combustion zone without using traditional feedback controllers, such as PID controllers, reducing the time and cost to tune the rotary machine.

FIG. 1 is a schematic view of an exemplary rotary machine 100, i.e., a turbomachine, and more specifically a turbine engine. In the exemplary embodiment, rotary machine 100 is a gas turbine engine. Alternatively, rotary machine may be any other turbine engine and/or rotary machine, including, without limitation, a steam turbine engine, a gas turbofan aircraft engine, other aircraft engine, a wind turbine, a compressor, and a pump. In the exemplary embodiment, gas turbine engine 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112.

It should be noted that, as used herein, the term "couple" is not limited to a direct mechanical, thermal, electrical, and/or flow communication connection between components, but may also include an indirect mechanical, thermal, electrical, and/or flow communication connection between multiple components. In the exemplary embodiment, combustor section 106 includes a plurality of combustors 114. Combustor section 106 is coupled to compressor section 104 such that each combustor 114 is in flow communication with the compressor section 104. Rotor shaft 112 is further coupled to a load 116 such as, but not limited to, an electrical generator and/or a mechanical drive application. In the exemplary embodiment, each of compressor section 104 and turbine section 108 includes at least one rotor assembly 118 that is coupled to rotor shaft 112.

In this embodiment, intake section 102 includes at least one inlet guide vane 103 that is controlled by an inlet guide vane controller 105. Inlet guide vanes 103 control a flow of inlet air 120 that intake section 102 channels from the atmosphere to compressor section 104. Specifically, inlet guide vanes 103 may include variable or fixed airfoils 107 that direct inlet air 120 to compressor section 104. Inlet guide vanes 103 change an angle of flow of inlet air 120 to increase the efficiency of compressor section 104. Additionally, airfoils 107 of inlet guide vanes 103 may be variable, or an angle of airfoils 107 relative to compressor section 104 may be changed, to vary the angle of flow of inlet air 120 and increase the efficiency of compressor section 104 during different operating conditions.

In the exemplary embodiment, combustors 114 include Axial Fuel Staging (AFS) technology including axial (sequential) staging of combustion in at least two zones. Specifically, combustors 114 are axially staged combustors that each include a first combustion zone 115, a second combustion zone 117, at least one first fuel nozzle 119, and at least one second fuel nozzle 121. The at least one first fuel nozzle 119 is positioned upstream of the at least one second fuel nozzle 121 and channels a first flow of fuel to into first combustion zone 115, which is correspondingly upstream of second combustion zone 117. The at least one second fuel nozzle 121 is positioned downstream of the at least one first fuel nozzle 119 and first combustion zone 115 and channels a second flow of fuel to into second combustion zone 117. First combustion zone 115 and second combustion zone 117 stage the combustion of a total flow of fuel to the combustor to control the combustion dynamics within combustors 114. In the exemplary embodiment, a single first fuel nozzle 119 and a single second fuel nozzle 121 are illustrated in FIG. 1. However, combustor 114 may include a plurality of first fuel nozzles 119 and/or a plurality of second fuel nozzles 121.

Rotary machine 100 also includes a fuel supply system 130 including at least one valve 132 that controls a fuel split of the total flow of fuel. The fuel split corresponds to an apportionment of a total fuel flow to the combustor between the first flow and the second flow. In the exemplary embodiment, the fuel split is represented as the fraction of the total flow of fuel that is channeled to the at least one second fuel nozzle 121 (i.e., the second flow of fuel divided by the sum of the first and second flow of fuel). Alternatively, the fuel split is represented in any suitable fashion. Specifically, fuel supply system 130 channels the total flow of fuel to combustors 114. More specifically, fuel supply system 130 channels the total flow of fuel to first fuel nozzle 119 and second fuel nozzle 121 which, in turn, channel the total flow of fuel to first combustion zone 115 and second combustion zone 117 respectively. Valve 132 splits the total flow of fuel into the first flow of fuel and the second flow of fuel according to the selected fuel split. As will be described in greater detail below, controlling the fuel split controls the $T_{3.5}$ temperature, which controls the combustion dynamics of combustor 114.

Rotary machine 100 further includes a computing device 134 that controls at least one operating parameter of rotary machine 100. More specifically, in the exemplary embodiment, computing device 134 controls the fuel split of the total flow of fuel to combustors 114 by controlling valve 132. Additionally, computing device 134 may also control inlet guide vane controller 105 and/or directly control inlet guide vanes 103 to control flow of inlet air 120 that is channeled to combustors 114. Accordingly, computing device 134 controls the stoichiometry of the combustion reaction within combustors 114 by controlling both the fuel split and flow of inlet air 120 to combustors 114.

Computing device 134 also is programmed to execute a digital simulation of rotary machine 100 that accurately determines at least one temperature within combustor 114. More specifically, the digital simulation accurately determines the $T_{3.5}$ and the $T_{3.9}$ temperatures within combustor 114. The $T_{3.5}$ temperature is the temperature within combustor 114 that is within first combustion zone 115 and axially upstream of second fuel nozzle 121 and second combustion zone 117. The $T_{3.9}$ temperature is the temperature within combustor 114 within second combustion zone 117 and axially downstream of second fuel nozzle 121. As will be discussed in greater detail below, computing device 134 controls the fuel split and flow of inlet air 120 to combustors 114 to control the $T_{3.5}$ temperature using the digital simulation.

During operation, intake section 102 channels inlet air 120 towards compressor section 104. Computing device 134 and/or inlet guide vane controller 105 control inlet guide vanes 103 to control flow of inlet air 120. Compressor section 104 compresses inlet air 120 to higher pressures prior to discharging compressed air 122 towards combustor section 106. Compressed air 122 is channeled to combustor section 106 where it is mixed with fuel (not shown) and burned to generate high temperature combustion gases 124. Computing device 134 controls the fuel split to first fuel nozzle 119 and second fuel nozzle 121 to control the $T_{3.5}$ temperature within combustors 114 using the digital simulation. Combustion gases 124 are channeled downstream towards turbine section 108 and impinge upon turbine blades (not shown), converting thermal energy to mechanical rotational energy that is used to drive rotor assembly 118 about a longitudinal axis 126. Often, combustor section 106 and turbine section 108 are referred to as a hot gas section of turbine engine 100. Exhaust gases 128 then discharge through exhaust section 110 to ambient atmosphere or to a steam turbine (not shown), if the rotary machine 100 is a gas turbine that is part of a combined cycle power plant.

Figure 2A:
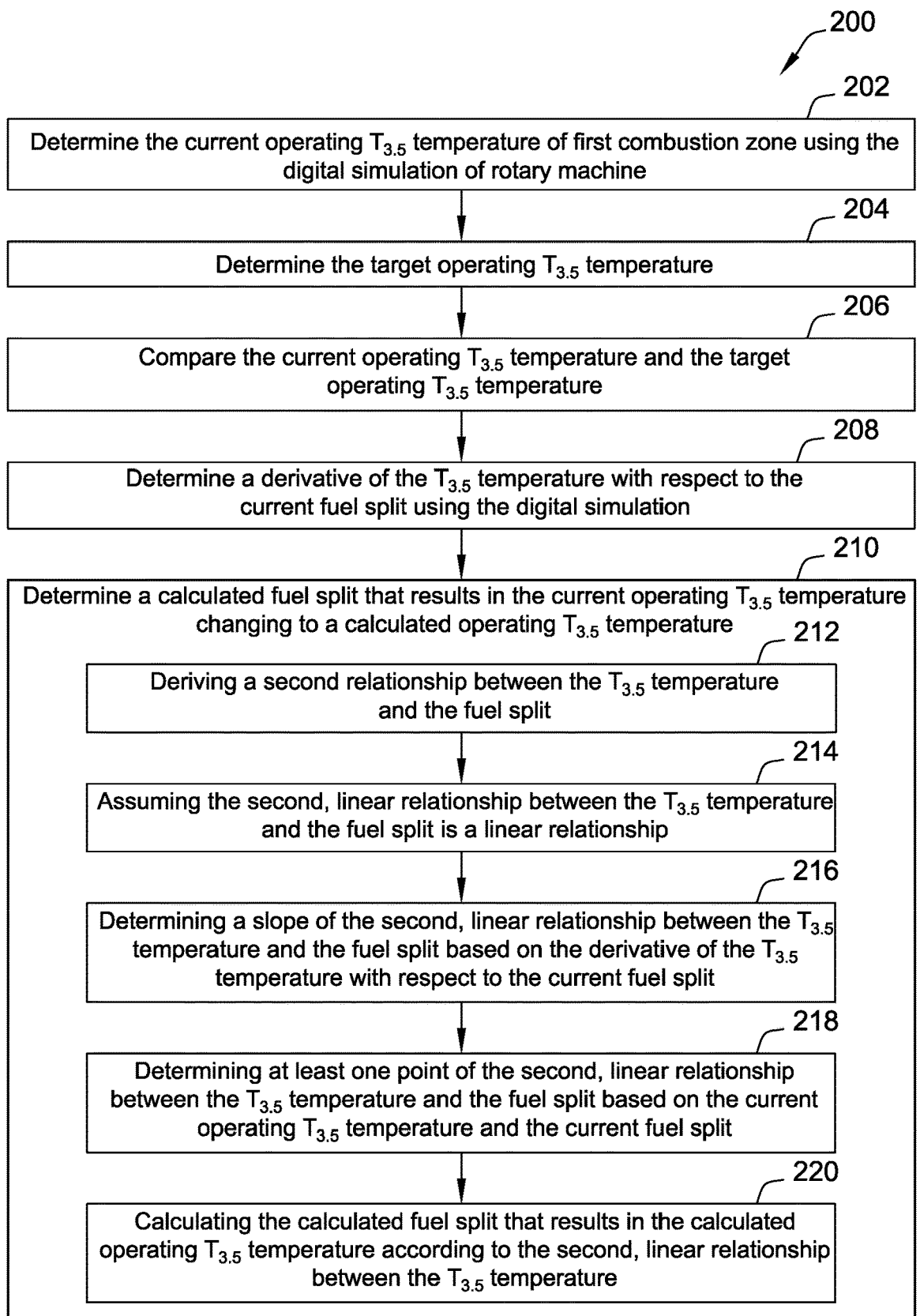
FIG. 2A is a flow diagram of an exemplary method of controlling a temperature of a first combustion zone of a combustor of the rotary machine shown in FIG. 1.
Figure 2B:
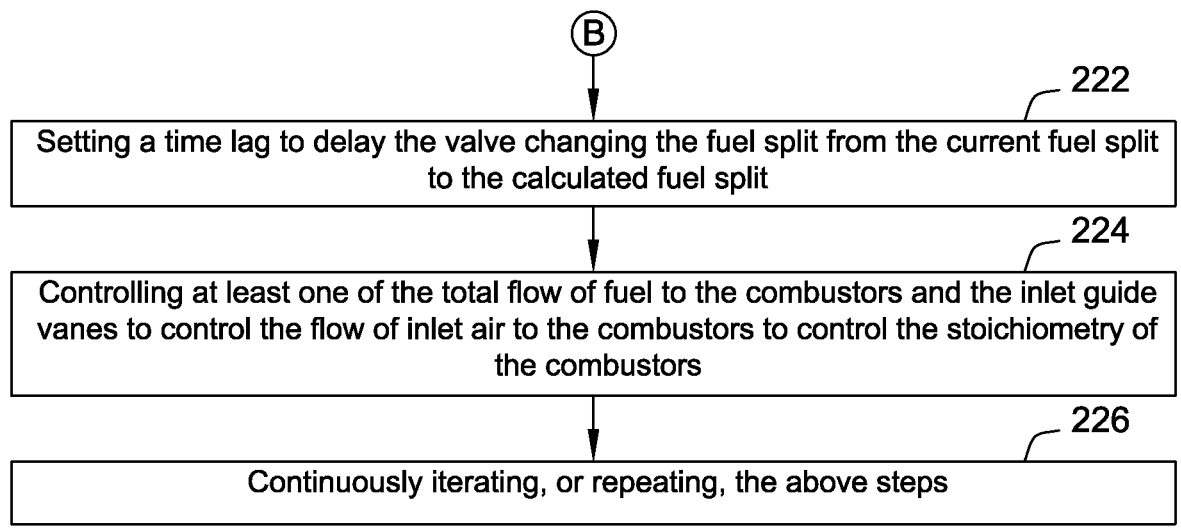
FIG. 2B is a continuation of the flow diagram of an exemplary method of controlling a temperature of a first combustion zone of a combustor of the rotary machine shown in FIG. 2A.
Figure 3:
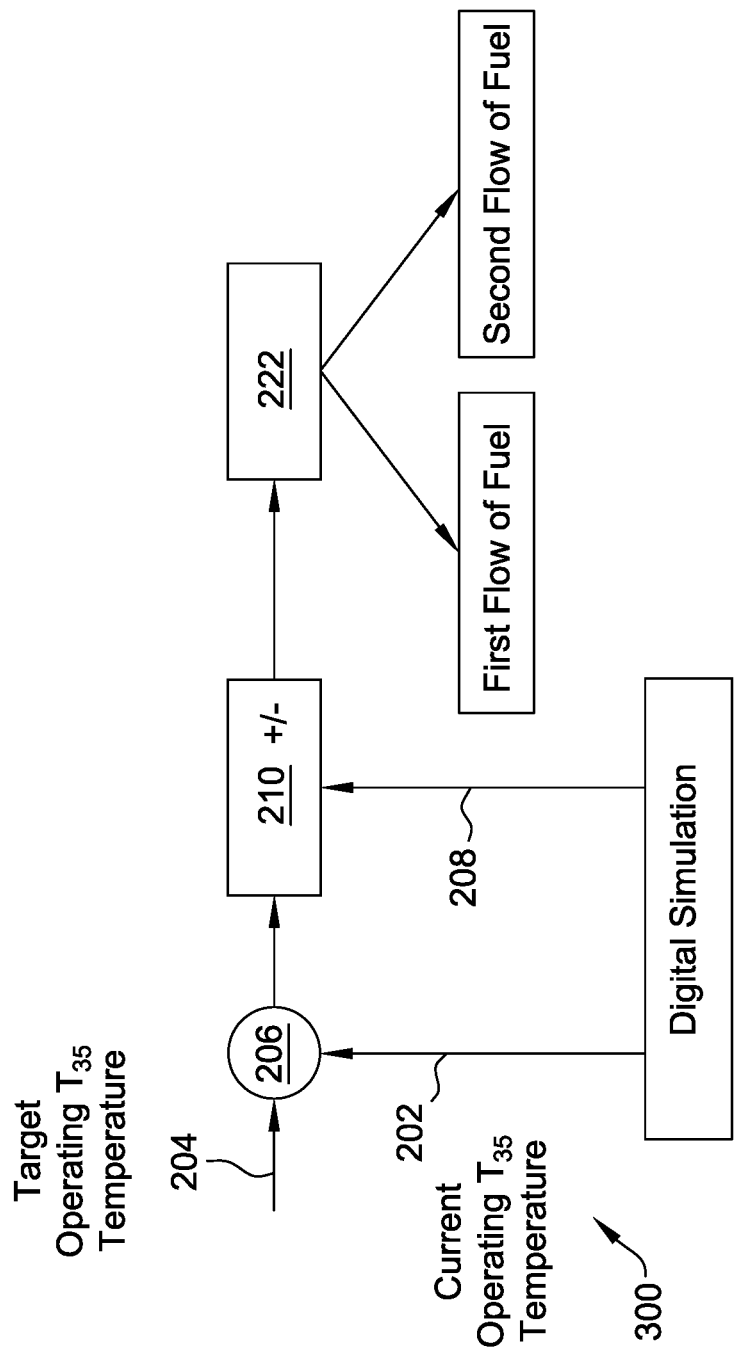
FIG. 3 is a control diagram illustrating the method of controlling the temperature of the first combustion zone of the combustor of the rotary machine shown in FIG. 2.

FIG. 2 is a flow diagram of an exemplary method 200 of controlling a temperature of first combustion zone 115 of combustor 114 of rotary machine 100. FIG. 3 is a control diagram 300 illustrating method 200 of controlling the temperature of first combustion zone 115 of combustor 114 of rotary machine 100 shown in FIG. 2. Method 200 includes determining 202 the current operating $T_{3.5}$ temperature of first combustion zone 115 using the digital simulation of rotary machine 100. The digital simulation is a model of rotary machine 100. Specifically, the digital simulation is a model that accurately determines the operating state of a plurality of operating parameters within rotary machine 100 in real time during operation of rotary machine 100 based on control inputs to computing device 134 and/or feedback from suitable sensors (not shown) positioned throughout rotary machine 100. More specifically, the digital simulation is a thermodynamic and fluid dynamic model that accurately determines the operating state of the plurality of operating parameters within rotary machine 100 in real time during operation of rotary machine 100. The plurality of operating parameters that the digital simulation determines includes, among many other parameters, the $T_{3.5}$ and the $T_{3.9}$ temperatures within combustor 114. Accordingly, the digital simulation determines the $T_{3.5}$ and the $T_{3.9}$ temperatures within combustor 114 in real time during operation of rotary machine 100. In the exemplary embodiment, the digital simulation is an existing simulation used to model rotary machine 100. In alternative embodiments, the digital simulation is a new digital simulation of rotary machine 100 or a new simulation of only combustor 114.

Method 200 also includes determining 204 a target operating $T_{3.5}$ temperature. In the exemplary embodiment, determining 204 the target operating $T_{3.5}$ temperature includes determining 204 the target operating $T_{3.5}$ temperature using an exit temperature of compressor section 104 and a combustor mode. As discussed above, combustor 114 may include a plurality of first fuel nozzles 119 and a plurality of second fuel nozzles 121. The arrangement of the plurality of first fuel nozzles 119 and the plurality of second fuel nozzles 121 (i.e., which nozzles of the plurality of first fuel nozzles 119 and/or the plurality of second fuel nozzles 121 are flowing at a given time) at least partially determines the combustor mode. Accordingly, the target operating $T_{3.5}$ temperature is at least partially determined by the exit temperature of compressor section 104 and the combustor mode. At least some combustion modes are configured for low load conditions, while other combustion modes are configured for high load conditions. Each operating mode has a different ideal $T_{3.5}$ temperature to optimize emissions and/or dynamics of rotary machine 100. In some embodiments, the target operating $T_{3.5}$ temperature is determined by at least one compressor exit temperature versus $T_{3.5}$ temperature schedule. In some embodiments, each combustor mode has its own schedule.

In the exemplary embodiment, determining 204 the target operating $T_{3.5}$ temperature includes determining 204 the target operating $T_{3.5}$ temperature using the exit temperature of compressor section 104 and the combustor mode using the digital simulation and/or computing device 134. The digital simulation and/or computing device 134 may determine the target operating $T_{3.5}$ temperature on an iterative basis, simultaneously with determining 202 the temperature of first combustion zone 115. For example, conditions may change that require updating of the target operating $T_{3.5}$ temperature in order for rotary machine 100 to meet load and emissions requirements. For example, the requirements on load 116 may increase or decrease, and, as such, the operating conditions of rotary machine 100 may change to accommodate the changing requirements on load 116. Specifically, to accommodate the changing requirements on load 116, the target $T_{3.5}$ operating temperature may change. In alternative embodiments, the target operating $T_{3.5}$ temperature may be determined by an operator or by some other method, rather than by the digital simulation, and/or may not be updated iteratively with every control cycle.

Method 200 further includes comparing 206 the current operating $T_{35}$ temperature and the target operating $T_{35}$ temperature. If the current operating $T_{35}$ temperature and the target operating $T_{35}$ temperature are different, computing device 134 controls the fuel split to change the current operating $T_{35}$ temperature to the target operating $T_{35}$ temperature as described below.

Method 200 also includes determining 208 a derivative of the $T_{35}$ temperature with respect to the current fuel split using the digital simulation. In the exemplary embodiment, the digital simulation may determine the derivative of the $T_{35}$ temperature with respect to the current fuel split simultaneously with determining 202 the temperature of first combustion zone 115 using the digital simulation of rotary machine 100. Additionally, small perturbations in the fuel split may be used to model the derivative of the $T_{35}$ temperature. Accordingly, an additional digital simulation module to determine the derivative of the $T_{35}$ temperature with respect to the current fuel split is not required. Additionally, in the exemplary embodiment, the digital simulation determines the derivative of the $T_{35}$ temperature with respect to the current fuel split by simulating small changes in the current fuel split and evaluating, via the digital simulation, the corresponding change that results in the simulated $T_{35}$ temperature. Alternatively, the digital simulation determines the derivative of the $T_{3.5}$ temperature with respect to the current fuel split in any suitable fashion.

Figure 4:
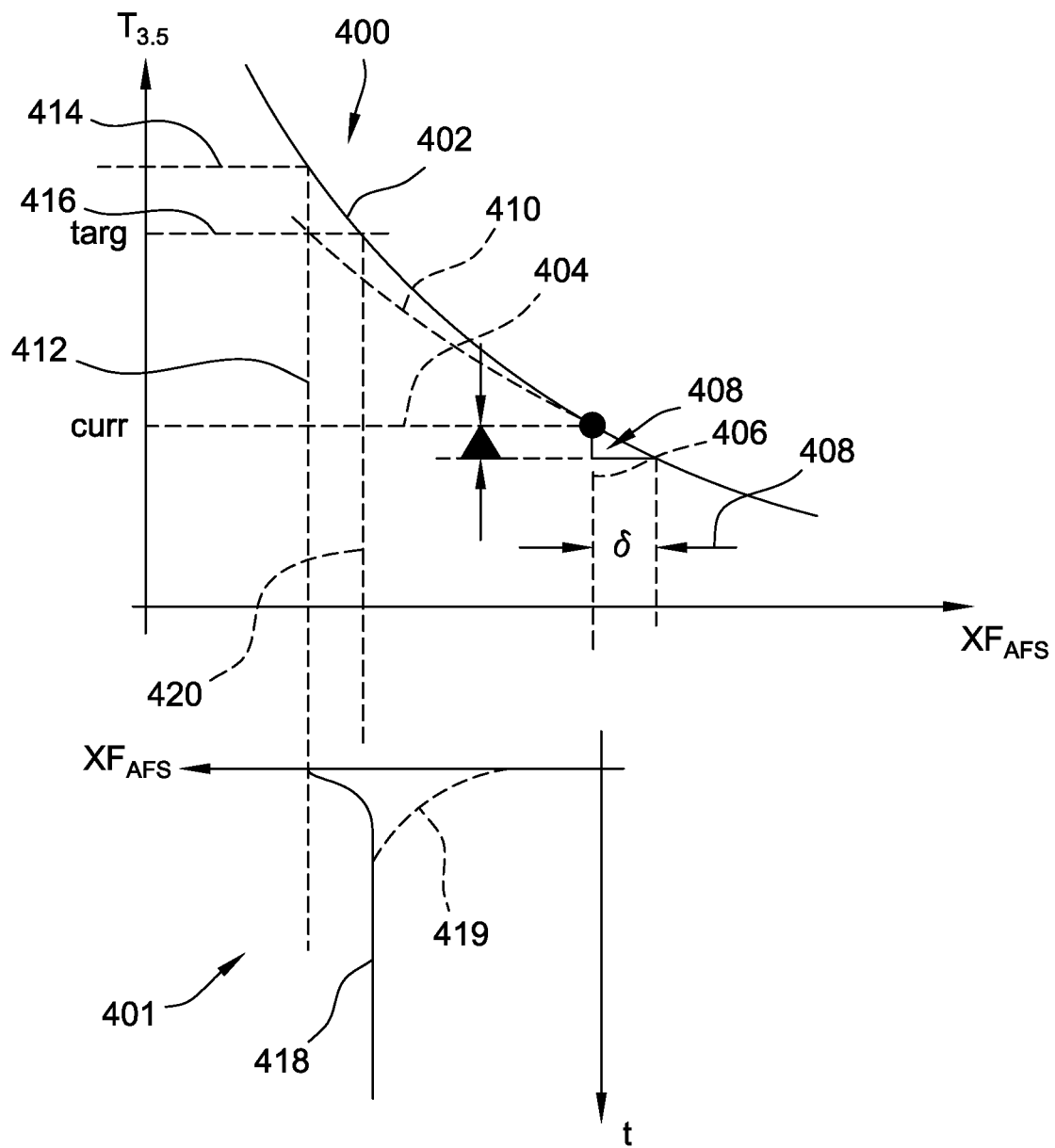
FIG. 4 is a first graph of a relationship between a $T_{3.5}$ temperature and a fuel split and of a numerical method used to determine a target fuel split, and a second graph of a corresponding transient response of the fuel split over time.

Method 200 further includes calculating 210, using the determined derivative, a calculated fuel split that results in a calculated operating $T_{3.5}$ temperature 414 that approaches the target operating $T_{3.5}$ temperature, i.e. calculated operating $T_{3.5}$ temperature 414 moves closer to the target operating $T_{3.5}$ temperature than is the current operating $T_{3.5}$ temperature. In the exemplary embodiment, computing device 134 determines 210 the calculated fuel split using numerical methods on outputs from the digital simulation. FIG. 4 includes a first graph 400 that includes a graphical representation 402 of the relationship between the $T_{3.5}$ temperature and the fuel split, with additional dashed lines illustrating a numerical method used to determine the calculated fuel split. FIG. 4 also includes a second graph 401 that includes a corresponding graphical representation 418 of a transient response of the fuel split over time. The illustration in FIG. 4 of graphical representation 402 of the relationship between the $T_{3.5}$ temperature and the fuel split as a smooth curve is for convenience of illustration only. The actual relationship between the $T_{3.5}$ temperature and the fuel split may be a more complex relationship.

Determining 210 the calculated fuel split that corresponds to the calculated operating $T_{3.5}$ temperature includes using numerical methods to determine the calculated fuel split. For example, as shown in FIG. 4 and described above, the digital simulation determines a current operating $T_{3.5}$ temperature 404, a current fuel split 406, and a derivative 408 of the $T_{3.5}$ temperature with respect to the current fuel split 406. For example, as discussed above, derivative 408 is determined from the corresponding change A that results in the simulated $T_{3.5}$ temperature due to a small change δ in the current fuel split. Computing device 134 receives current operating $T_{3.5}$ temperature 404, current fuel split 406, and derivative 408 of the $T_{3.5}$ temperature with respect to the current fuel split and derives a second relationship 410 between the $T_{3.5}$ temperature and the fuel split. Second relationship 410 between the $T_{3.5}$ temperature and the fuel split is illustrated in FIG. 4 as a straight line extension of derivative 408 from current fuel split 406, i.e., a straight line having a slope that equals derivative 408 of the $T_{3.5}$ temperature with respect to the current fuel split and intersecting a point having an x-axis coordinate that equals current fuel split 406 and a y-axis coordinate that equals current operating $T_{3.5}$ temperature 404. Computing device 134 uses second relationship 410 between the $T_{3.5}$ temperature and the fuel split to solve for a calculated fuel split 412 that results in a calculated operating $T_{3.5}$ temperature 414 approaching the target operating $T_{3.5}$ temperature 416. More specifically, in the exemplary embodiment, computing device 134 determines the intersection of second relationship 410 with target operating $T_{3.5}$ temperature 416, and sets calculated fuel split 412 as the x-axis coordinate of that intersection. The point on graphical representation 402 having calculated fuel split 412 has a y-axis coordinate that determines calculated operating $T_{3.5}$ temperature 414. In the exemplary embodiment, due to the nature of the derivative 208, calculated operating $T_{3.5}$ temperature 414 is typically closer to target operating $T_{3.5}$ temperature than is current operating $T_{3.5}$ temperature 404.

Accordingly, determining 210 the calculated fuel split that results in the current operating $T_{3.5}$ temperature changing to the calculated operating $T_{3.5}$ temperature that approaches the target operating $T_{3.5}$ temperature 416 may include deriving 212 second relationship 410 between the $T_{3.5}$ temperature and the fuel split. Determining 210 the calculated fuel split that results in the calculated operating $T_{3.5}$ temperature that approaches the target operating $T_{3.5}$ temperature 416 may also include assuming 214 second relationship 410 between the $T_{3.5}$ temperature and the fuel split is a linear relationship. Determining 210 the calculated fuel split that results in the calculated operating $T_{3.5}$ temperature that approaches the target operating $T_{3.5}$ temperature 416 may further include determining 216 a slope of second relationship 410 between the $T_{3.5}$ temperature and the fuel split based on derivative 208 of the $T_{3.5}$ temperature with respect to the current fuel split. Determining 210 the calculated fuel split that results in the calculated operating $T_{3.5}$ temperature that approaches the target operating $T_{3.5}$ temperature 416 may also include determining 218 at least one point of second relationship 410 between the $T_{3.5}$ temperature and the fuel split 410 based on current operating $T_{3.5}$ temperature 404 and current fuel split 406. Determining 210 the calculated fuel split that results in the calculated operating $T_{3.5}$ temperature that approaches the target operating $T_{3.5}$ temperature 416 may further include calculating 220 calculated fuel split 412 that results in calculated operating $T_{3.5}$ temperature 414 according to an intersection of the second relationship 410 and the target operating $T_{3.5}$ temperature 416.

After computing device 134 has determined calculated fuel split 412, computing device 134 controls valve 132 to adjust the total flow of fuel into the first flow of fuel and the second flow of fuel in response to calculated fuel split 412. After valve 132 has adjusted the fuel split, the operating state of combustor 114 and rotary machine 100 changes and the digital simulation iterates method 200 as necessary in order to achieve target operating $T_{3.5}$ temperature 416.

More specifically, as shown in graph 400, because the second relationship 410 between the $T_{3.5}$ temperature and the fuel split 410 is only a linear approximation of complex graphical representation 402, calculated fuel split 412 typically does not initially result in target operating $T_{3.5}$ temperature 416. Rather, changing current fuel split 408 to calculated fuel split 412 results in calculated operating $T_{3.5}$ temperature 414 that approaches, but is different from, target operating $T_{3.5}$ temperature 416. Accordingly, in the exemplary embodiment, computing device 134 is programmed to continuously iterate, or repeat, the above steps of method 200. In alternative embodiments, computing device 134 is programmed to iterate, or repeat, the above steps of method 200 until calculated operating $T_{3.5}$ temperature 414 is equal to, i.e., converges to within a functionally sufficient distance of, target operating $T_{3.5}$ temperature 416.

Illustrated below graph 400 is graph 401 including a corresponding graphical representation 418 of the transient response of the fuel split over time without a time lag and a corresponding graphical representation 419 of the transient response of the fuel split over time with a time lag. Like graph 400, graph 401 has an x-axis that represents the fuel split, but, in contrast to graphical representation 402, graph 401 has a y-axis that represents time extending away from graph 400. Graph 401 is positioned relative to graph 400 such that the x-axis values of current fuel split 406 and calculated fuel split 412 align on both graph 400 and graph 401.

As shown in graphical representation 418, calculated fuel split 412 initially overshoots a target fuel split 420, which represents the fuel split that actually results in target operating $T_{3.5}$ temperature 416, and then approaches and substantially equals target fuel split 420 as method 200 is iterated. However, in some embodiments, abrupt changes in the fuel split may cause operation of combustor 114 and rotary machine 100 to become unstable. Accordingly, in some embodiments, a first-order lag time constant is set by the operator to delay the response of the fuel split to method 200. Specifically, in order to prevent the fuel split from instantly jumping to calculated fuel split 412 in step-wise fashion, the first-order lag time constant is set to cause the fuel split to smoothly change from current fuel split 406 to calculated fuel split 412. More specifically, the first-order lag slows down the rate at which valve 132 changes the fuel split from current fuel split 406 to calculated fuel split 412. Additionally, because valve 132 is not instantaneously changing the fuel split, method 200 may iterate multiple times before the fuel split applied by valve 412 during a given iteration reaches the commanded calculated fuel split 412. The choice of the first-order lag time constant explicitly defines the response time of the control, whereas conventional PI regulators would leave the time response characteristic to be determined by analysis, making adjustment of the time response more intuitive and easy. Thus, calculated fuel split 412 is continually refined and changed as valve 132 changes the fuel split. Accordingly, as shown in graphical representation 419, the fuel split gradually changes from current fuel split 406 to target fuel split 420 because the first-order lag slows down the rate at which valve 132 changes the fuel split from current fuel split 406 to calculated fuel split 412. In some embodiments, by the time an iteration is reached in which valve 132 succeeds in changing the fuel split from current fuel split 406 to the commanded calculated fuel split 412 for that iteration, calculated fuel split 412 equals target fuel split 420. Therefore, method 200 may also include setting 222 a first-order lag to delay valve 132 changing the fuel split from current fuel split 406 to calculated fuel split 412.

Additionally, computing device 134 and digital simulation may also control inlet guide vanes 103 to control flow of inlet air 120 and the stoichiometry of combustors 114. Moreover, computing device 134 and the digital simulation may further control the total flow of fuel to combustors 114 to further control the stoichiometry of combustors 114. As such, computing device 134 and digital simulation may control the stoichiometry of combustors 114 by controlling the total flow of fuel to combustors 114 and/or by controlling inlet guide vanes 103 to control flow of inlet air 120. Accordingly, method 200 may also include controlling 224 at least one of the total flow of fuel to combustors 114 and/or controlling inlet guide vanes 103 to control flow of inlet air 120 to combustors 114 to control the stoichiometry of combustors 114.

Additionally, computing device 134 is programmed to continuously iterate 226, or repeat, the above steps of method 200. In alternative embodiments, computing device 134 is programmed to iterate 226, or repeat, the above steps of method 200 until calculated operating $T_{3.5}$ temperature 414 is equal to, i.e., converges to within a functionally sufficient distance of, target operating $T_{3.5}$ temperature 416.

The above described systems relate to a method for controlling a temperature of a first combustion zone of a combustor of a gas turbine engine using a digital simulation. More specifically, the combustor includes the first combustion zone, a second combustion zone, at least one first fuel nozzle, and at least one second fuel nozzle. The at least one first fuel nozzle channels a first flow of fuel to the first combustion zone, and the at least one second fuel nozzle channels a second flow of fuel to the second combustion zone. A fuel split is a fraction of a total flow of fuel that is channeled to the second combustion zone. The digital simulation simultaneously determines a current operating temperature of the first combustion zone, a target operating temperature of the first combustion zone, and a derivative of the current operating temperature of the first combustion zone with respect to a current fuel split. A computing device then calculates a calculated fuel split that results in a calculated operating temperature of the first combustion zone using numerical methods. The first flow of fuel and the second flow of fuel are determined by the calculated fuel split, and the first flow of fuel is channeled to the first combustion zone and the second flow of fuel is channeled to the second combustion zone. The method is iterated until the calculated fuel split equals a target fuel split that results in the target operating temperature. Accordingly, the systems and methods described herein control the temperature of the first combustion zone without using traditional feedback controllers, such as PID controllers, reducing the time and cost to tune the rotary machine.

Additionally, an exemplary technical effect of the systems and methods described herein includes at least one of: (a) controlling a temperature of a first combustion zone of a combustor; (b) channeling a first flow of fuel to the first combustion zone based on a calculated fuel split; (c) channeling a second flow of fuel to the second combustion zone based on the calculated fuel split; (d) controlling the combustion dynamics of the combustor; and (e) controlling the emissions of the combustor.

Exemplary embodiments of systems and methods for controlling a temperature of a first combustion zone of a combustor of a gas turbine engine using a digital simulation are described above in detail. The methods and systems are not limited to the specific embodiments described herein, but rather, components of systems and/or steps of the methods may be utilized independently and separately from other components and/or steps described herein. For example, the method may also be used in combination with other rotary machines, and are not limited to practice only with the gas turbine engines as described herein. Rather, the exemplary embodiment can be implemented and utilized in connection with many other rotary machine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling an operating temperature of a first combustion zone of a combustor of a rotary machine, the combustor including the first combustion zone and a second combustion zone, said method comprising:
   i) determining a current operating temperature of the first combustion zone using a digital simulation of the rotary machine;
   ii) determining a target operating temperature of the first combustion zone;
   iii) determining a derivative of the current operating temperature of the first combustion zone with respect to a current fuel split using the digital simulation, wherein the fuel split apportions a total flow of fuel to the combustor between the first combustion zone and the second combustion zone;
   iv) calculating, using the determined derivative, a calculated fuel split that results in a calculated operating temperature of the first combustion zone approaching the target operating temperature;
   v) channeling a first flow of fuel to the first combustion zone and a second flow of fuel to the second combustion zone, wherein the first flow of fuel and the second flow of fuel are determined in response to the calculated fuel split; and
   vi) iterating steps i through v until the calculated fuel split equals a target fuel split, wherein the target fuel split is the fuel split that results in the target operating temperature.

2. The method of claim 1 further comprising comparing the current operating temperature to the target operating temperature.

3. The method of claim 1, wherein calculating the calculated fuel split that results in a calculated operating temperature of the first combustion zone comprises deriving a second relationship between the operating temperature and the fuel split.

4. The method of claim 3, wherein calculating the calculated fuel split that results in a calculated operating temperature of the first combustion zone comprises assuming the second relationship between the operating temperature and the fuel split is a linear relationship.

5. The method of claim 4, wherein calculating the calculated fuel split that results in a calculated operating temperature of the first combustion zone comprises determining a slope of the second relationship between the operating temperature and the fuel split based on the derivative of the current operating temperature of the first combustion zone with respect to the current fuel split.

6. The method of claim 5, wherein calculating the calculated fuel split that results in a calculated operating temperature of the first combustion zone comprises determining at least one point of the second relationship between the operating temperature and the fuel split based on the current operating temperature and the current fuel split.

7. The method of claim 6, wherein calculating the calculated fuel split that results in a calculated operating temperature of the first combustion zone comprises calculating the calculated fuel split that results in the calculated operating temperature based on the second relationship between the operating temperature and the fuel split.

8. The method of claim 1 further comprising setting a first-order lag time constant to delay changing the fuel split from the current fuel split to the calculated fuel split.

9. The method of claim 1 further comprising controlling a total flow of fuel to the combustor to control a stoichiometry of the combustor.

10. The method of claim 1 further comprising controlling a flow of inlet air to the combustor to control a stoichiometry of the combustor.

11. The method of claim 1, wherein the step of determining the target operating temperature of the first combustion zone is performed by the digital simulation simultaneously with the determining the current operating temperature of the first combustion zone using the digital simulation.

12. The method of claim 1, wherein the step of determining the derivative of the current operating temperature of the first combustion zone with respect to the current fuel split using the digital simulation is performed simultaneously with determining a current operating temperature of the first combustion zone using the digital simulation of the rotary machine.

13. A rotary machine comprising: a compressor configured to compress a flow of inlet air; a combustor comprising a first combustion zone, a second combustion zone, at least one first fuel nozzle, and at least one second fuel nozzle, wherein said at least one first fuel nozzle is configured to channel a first flow of fuel to said first combustion zone, and said at least one second fuel nozzle is configured to channel a second flow of fuel to said second combustion zone, and wherein said combustor is configured to receive the flow of inlet air, and wherein a fuel split is a fraction of a total flow of fuel that is channeled to said second combustion zone; and a computing device comprising a digital simulation of said rotary machine, wherein said computing device is configured to:
- (i) determining a current operating temperature of said first combustion zone using said digital simulation;
- (ii) determining a target operating temperature of said first combustion zone;
- (iii) simultaneously determining a derivative of the current operating temperature of said first combustion zone with respect to a current fuel split using said digital simulation;
- (iv) calculating a calculated fuel split that results in a calculated operating temperature of said first combustion zone using numerical methods; and
- (v) channeling the first flow of fuel to said first combustion zone and the second flow of fuel to said second combustion zone, wherein the first flow of fuel and the second flow of fuel are determined by the calculated fuel split; and
- (vi) iterating steps i-v until the calculated fuel split equals a target fuel split, wherein the target fuel split is the fuel split that results in the target operating temperature.

14. The rotary machine of claim 13 further comprising a fuel supply system configured to channel the total flow of fuel to said first combustion zone and said second combustion zone.

15. The rotary machine of claim 14, wherein said fuel supply system comprises at least one valve configured to split the total flow of fuel into the first flow of fuel and the second flow of fuel.

16. The rotary machine of claim 13 further comprising a plurality of inlet guide vanes configured to control the flow of inlet air into the combustor.

17. The rotary machine of claim 16 wherein said computing device is configured to control said inlet guide vanes.

18. The rotary machine of claim 13, wherein calculating the calculated fuel split that results in the calculated operating temperature of said first combustion zone comprises deriving a second relationship between the operating temperature and the fuel split.

19. The rotary machine of claim 18, wherein calculating the calculated fuel split that results in the calculated operating temperature of said first combustion zone comprises assuming the second relationship between the operating temperature and the fuel split is a linear relationship.

20. The rotary machine of claim 19, wherein calculating the calculated fuel split that results in the calculated operating temperature of said first combustion zone comprises determining a slope of the second relationship between the operating temperature and the fuel split based on the derivative of the current operating temperature of said first combustion zone with respect to the current fuel split.

* * * * *

UNITED STATES PATENT AND TRADEMARK OFFICE
CERTIFICATE OF CORRECTION

PATENT NO. : 11,333,082 B2
APPLICATION NO. : 16/900761
DATED : May 17, 2022
INVENTOR(S) : Jonathan Carl Thatcher et al.

It is certified that error appears in the above-identified patent and that said Letters Patent is hereby corrected as shown below:

In the Specification

Column 7, Line 30, delete "operating $T_{35}$ temperature and the target operating $T_{35}$," and insert therefor -- operating $T_{3.5}$ temperature and the target operating $T_{3.5}$ --.

Column 7, Line 31, delete "operating $T_{35}$ temperature," and insert therefor -- operating $T_{3.5}$ temperature --.

Column 7, Line 32, delete "operating $T_{35}$ temperature," and insert therefor -- operating $T_{3.5}$ temperature --.

Column 7, Line 34, delete "operating $T_{35}$ temperature to the target operating $T_{35}$," and insert therefor -- operating $T_{3.5}$ temperature to the target operating $T_{3.5}$ --.

Column 7, Line 37, delete "the $T_{35}$ temperature," and insert therefor -- the $T_{3.5}$ temperature --.

Column 7, Line 40, delete "$T_{35}$ temperature," and insert therefor -- $T_{3.5}$ temperature --.

Column 7, Line 44, delete "derivative of the $T_{35}$," and insert therefor -- derivative of the $T_{3.5}$ --.

Column 7, Line 46, delete "the $T_{35}$ temperature," and insert therefor -- the $T_{3.5}$ temperature --.

Column 7, Line 49, delete "the $T_{35}$ temperature," and insert therefor -- the $T_{3.5}$ temperature --.

Column 7, Line 53, delete "simulated $T_{35}$ temperature," and insert therefor -- simulated $T_{3.5}$ temperature --.

Column 8, Line 18, delete "corresponding change A," and insert therefor -- corresponding change $\Delta$ --.

Signed and Sealed this
Thirtieth Day of May, 2023

Katherine Kelly Vidal
*Director of the United States Patent and Trademark Office*